United States Patent [19]

Marek Jr. et al.

[11] 3,716,675

[45] Feb. 13, 1973

[54] FLEXIBLE TRANSLATOR

[75] Inventors: James John Marek Jr.; George William Taylor, both of Boulder, Colo.

[73] Assignee: Bell Telephone Laboratories, Incorporated, Murray Hill, Berkeley Heights, N.J.

[22] Filed: Dec. 8, 1971

[21] Appl. No.: 205,802

[52] U.S. Cl. ........................179/18 ET, 340/347 DD

[51] Int. Cl. ................................................H04q 3/47

[58] Field of Search .............179/18 ET; 340/347 DD

[56] References Cited

UNITED STATES PATENTS 3,527,896 9/1970 Hills et al..........................179/18 ET 3,618,047 11/1971 Hertz.........................340/347 DD X

*Primary Examiner*—Thomas W. Brown
*Attorney*—R. J. Guenther et al.

[57] ABSTRACT

A flexible translator arranged to translate one, three, and four digit input numbers into three digit output numbers. The translator includes a plurality of identical two and three terminal code gates each having an output defining the first two digits of the output numbers. The translator is arranged so that a single digit input enables digit detecting circuitry and a two terminal code gate to pass predetermined signals through the translator to obtain a corresponding three digit output number. The translator is further arranged so that the first two digits of three and four digit input numbers enable two terminals of predetermined ones of the three terminal code gates. For a three digit input number, the digit detecting circuitry enables the third terminal of preselected code gates and passes the last digit of the input number through the translator to obtain the three digit output number. For a four digit input number, the digit detecting circuitry utilizes the third digit of the four digit input number to enable the third terminal of other code gates and passes the last digit of the input number through the translator to obtain the three digit output number.

14 Claims, 5 Drawing Figures

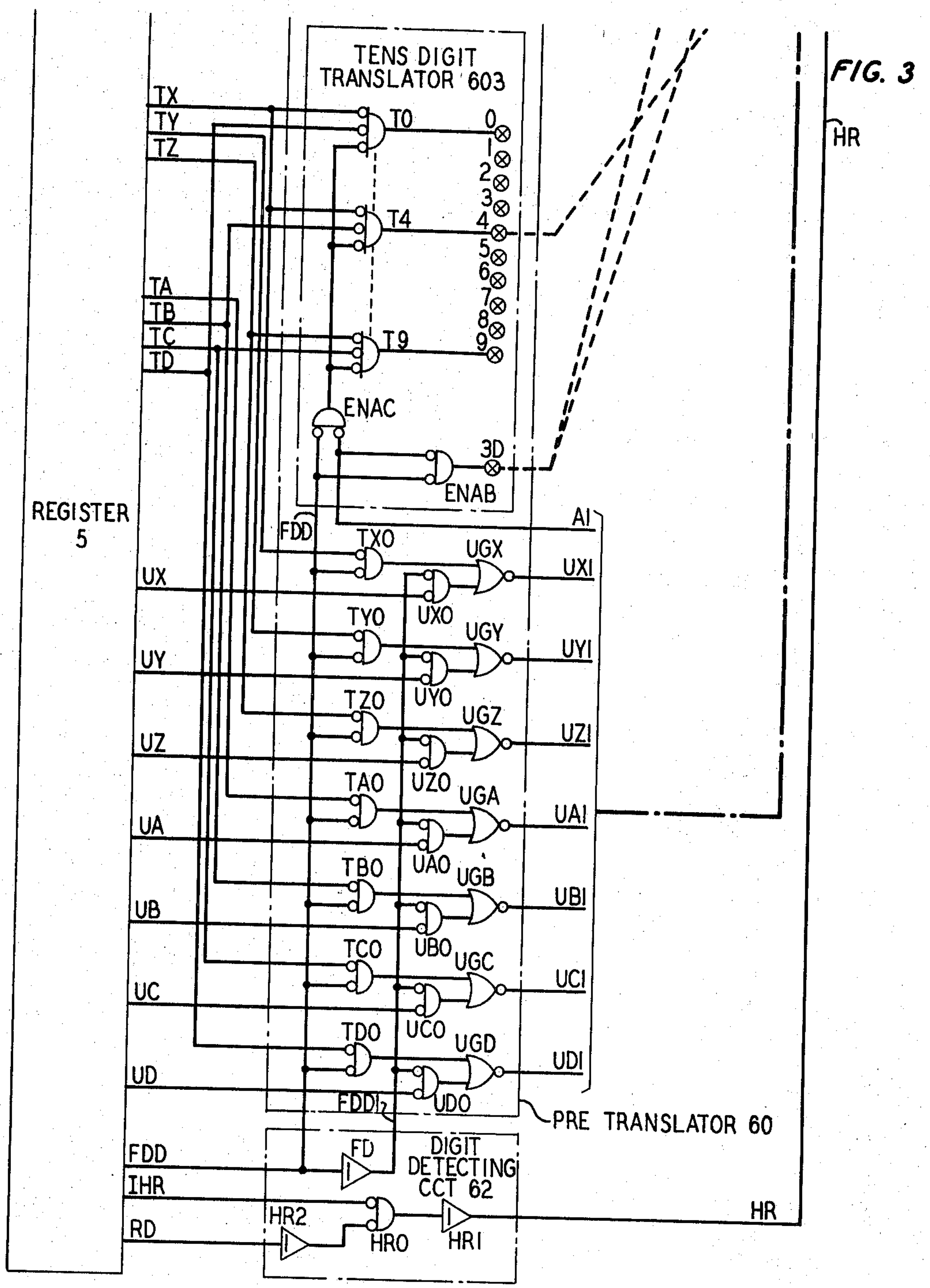
FIG. 3
FIG. 4
| | A | B | C | D |
|---|---|---|---|---|
| X | 1 | 4 | 7 | 0 |
| Y | 2 | 5 | 8 | |
| Z | 3 | 6 | 9 | R |
FIG. 5
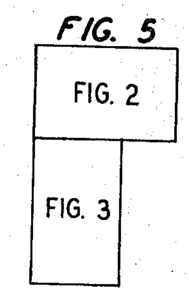

FLEXIBLE TRANSLATOR

BACKGROUND OF THE INVENTION

1. Field of the Invention

This invention concerns automatic switching systems. In particular it relates to a translation arrangement wherein a called station directory number may be translated into an equipment location number identifying the called station.

2. Description of the Prior Art

There has been an increasing demand in recent years for electronic private branch exchange switching systems that can provide communication services to meet the flexible demands of various types of customers. For example, it is desirable that guests registered at hotels and motels be permitted to take advantage of the many facilities offered for convenience of the guests by simply dialing a single digit from a room telephone station to establish a communication path to a specific administrative branch such as room service. Similarly, it may be that a customer located in an industrial environment would prefer to have a communication system wherein an employer may, by dialing single digits from stations, establish communication paths to other telephone stations to report fires and injuries.

It has also been recognized that other flexible dialing and numbering arrangements are of benefit to customers of electronic PBX switching systems. For example, a PBX switching system may be arranged so that stations can be assigned directory numbers corresponding to guest room numbers; this is of benefit to a hotel staff in reducing the amount of time required to associate guests and rooms to station directory numbers. Alternatively, a customer having a manufacturing firm might prefer having a PBX switching system wherein stations could be assigned numbers of the departmental areas to save administrative time in preparing company directories relating departmental areas with station numbers.

Electronic PBX switching systems have been developed for installation on customer premises to furnish basic communication service required by a customer. A specific example of such a switching system is the common control PBX switching system set forth by Henry H. Abbott et al., in U.S. Pat. No. 3,377,432 dated Apr. 9, 1968. In the prior art switching system disclosed by Abbott et al., connections are established between stations in response to dialed station numbers identifying the equipment location of the called stations within the switching system. The Abbott electronic switching system, although a substantial contribution to the switching art, is relatively inflexible with respect to assignment of station directory numbers. Stations of the Abbott system are required to be assigned fixed length directory numbers that are identical to the equipment location number of the stations within the switching system. Thus, a customer may not arbitrarily specify that variable length directory numbers be assigned to the stations of his switching system.

Translators have been developed for use with relay type switching systems wherein dialed multidigit station numbers may be translated into an equipment location of the called station. These types of translators initially require the installation of a full complement of relays and, in addition, require that the relays be crossconnected into unique groupings associated with each specific digit of a station number. Since the operation time of the relay groups is long compared to the call processing time of an electronic switching system the use of relay translators seriously affects the provision of communication service to customers of electronic PBX switching systems.

Accordingly, a need exists in the art for a translator arranged to work with an electronic switching system of the type disclosed in the aforementioned patent by Abbott et al., without adversely affecting call processing time. A need also exists for a translator capable of providing flexible numbering arrangements for switching systems wherein multidigit station directory numbers assigned to stations in accordance with customer's specific numbering requirements are translated into multidigit equipment numbers identifying called station locations within the switching system.

SUMMARY OF THE INVENTION

In the exemplary embodiment of the invention an electronic switching system for establishing communication paths between stations is provided with a flexible translator arranged so that a calling station may be connected to other stations by dialing one, three, or four digit station numbers.

The flexible translator is comprised of a plurality of two and three input terminal code gates each having an output defining the first two digits of a three digit equipment number identifying a called station. Pretranslating circuitry is provided to translate first dialed digits of a called station number into single code points corresponding to each dialed digit.

Stations identified by single dialed digits have one terminal of their respective two input terminal code gates selectively connected to the corresponding code point identifying the single dialed digit. Digit detecting circuitry detects the absence of a dialed second digit and enables the second terminal and causes the pretranslator to gate a rest digit through the translator to form the third digit of the called station equipment number.

The translator is further organized so that the first two dialed digits of three and four digit station numbers are translated into first coincident signals appearing on two input terminals of predetermined ones of the three input code gates. During a call sequence directed to a station identified by a three digit dialed number the digit digit detecting circuitry connects a second coincident signal to a single code point coupled to a third input terminal of a code gate, and initiates a sequence to a gate a third dialed digit through the translator to obtain the three digit called station equipment number. When a call is directed to a station assigned a four digit number, the digit detecting circuitry allows a code point corresponding to the third dialed digit to enable the third input terminal of a predetermined code gate and gates the fourth dialed digit through the translator to obtain the called station equipment number.

In accordance with an aspect of our invention the flexible translator utilizes multiterminal code gates for three digit and four digit dialed numbers. The first two dialed digits are pretranslated and applied to code points selectively connected to the first two input terminals of the code gates. The third digit of a four digit dialed number is similarly pretranslated and applied to code points selectively connected to the third input terminals of certain of the code gates while the last dialed digit is applied directly through the translator to connecting equipment.

In accordance with another aspect our invention a digit detecting circuit recognizes the occurrence of three digit dialed numbers. Under control of the digit detecting circuit, the third dialed digit is applied directly through the translator to the connecting equipment. The digit detecting circuit also enables a common code point selectively connected to the third input terminals of others of the code gates.

In accordance with a further aspect of our invention outputs of the code gates are connected to a post translator for generating first digits of the translated output number. The last digit of the translated number is applied directly through the translator.

In accordance with still a further aspect of our invention two terminal code gates are utilized for the translation of single digit called numbers, the first terminal of each such gate being connected to a pretranslator code point indicating the digit dialed and the second terminal being enabled by the digit detecting circuitry detecting the occurrence of a single dialed digit. The outputs of the two terminal code gates are connected to the post translator for the generation of the first two of the translated output digits while a predetermined digit is applied directly through the translator to the connecting equipment as the last digit.

DESCRIPTION OF THE DRAWING

The foregoing objects and advantages, as well as others of the invention, will be more apparent from a description of the drawing, in which:

FIGS. 2 and 3, when arranged in accordance with FIG. 5, set forth the circuit details of the translator apparatus, and FIG. 4 sets forth a table for converting number digits into a 2-out-of-7 code format.

Figure 2:
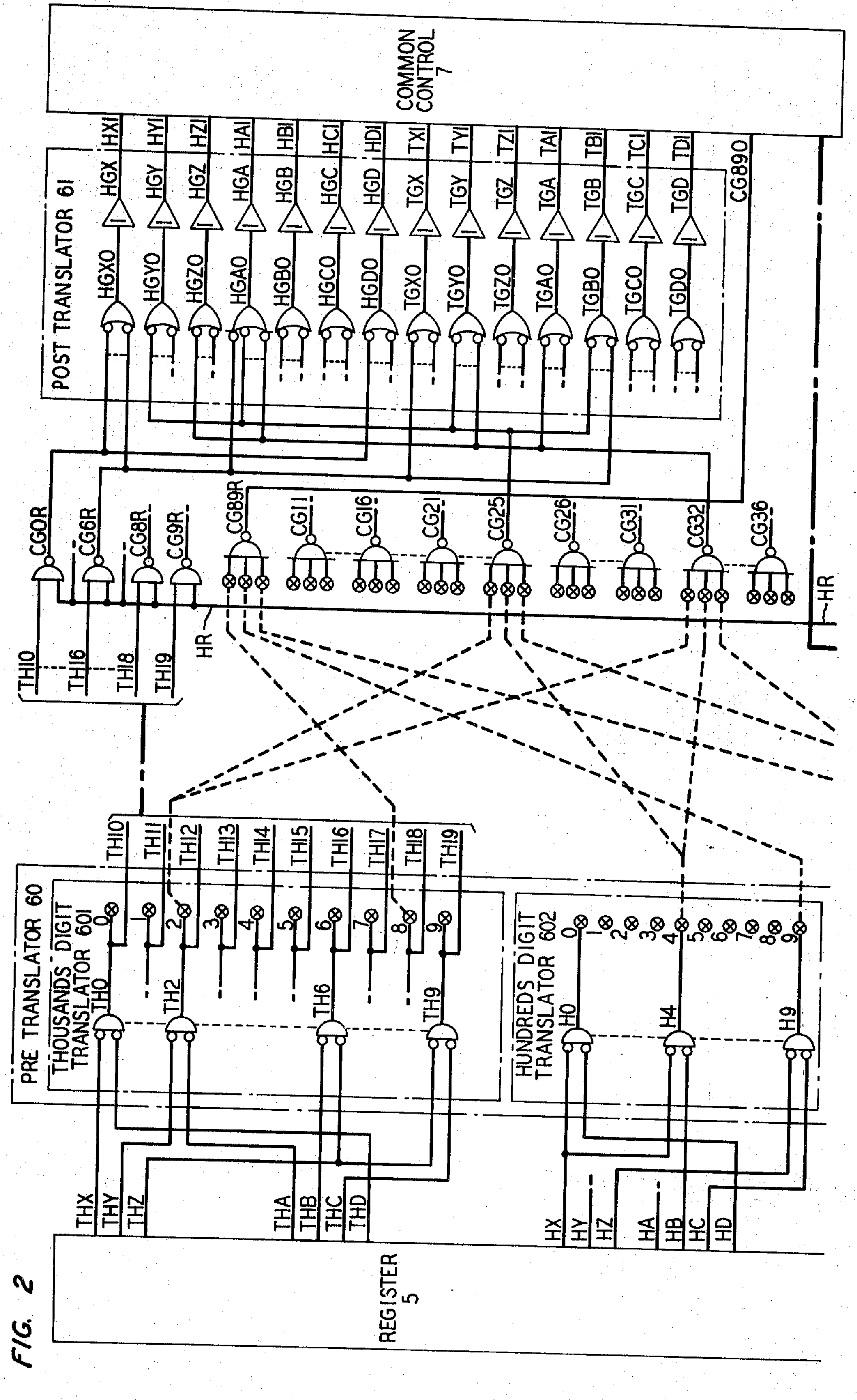

The detailed logic of the flexible translator apparatus shown in FIGS. 2 and 3 is performed by combinations of logic gates, the operation and schematic representation of which are well known in the art and are described by J. Millman and H. Taub in the textbook *Pulse, Digital, and Switching Waveforms*, 1965, McGraw-Hill, Inc. The instant embodiment of the invention utilizes NAND and NOR gates in the well-known manner to perform both AND and OR logic functions. In order to differentiate between functions those NAND gates performing AND functions are hereinafter referred to as NAND gates and are symbolically shown by the logic symbol of gate CGOR set forth in FIG. 2 of the drawing, while those NAND gates performing OR functions are also referred to as NAND gates but are set forth in the drawing by the logic symbol utilized for gate HGXO of FIG. 2. Similarly, NOR gates performing OR and AND functions are referred to as NOR gates and are illustrated in the drawing by the logic symbol utilized for gates UGX and TXO, respectively, of FIG. 3. Where logic symbols are involved, a circle on an input is an indication that a low signal is required to activate the circuit. The absence of a circle is used to indicated that a high signal is required to activate the circuit. The resulting polarity of a circuit output may be determined in the same manner. For example, high coincident signals on the input terminals of NAND code gate CG6R of FIG. 2 results in a low signal output.

GENERAL DESCRIPTION

Figure 1:
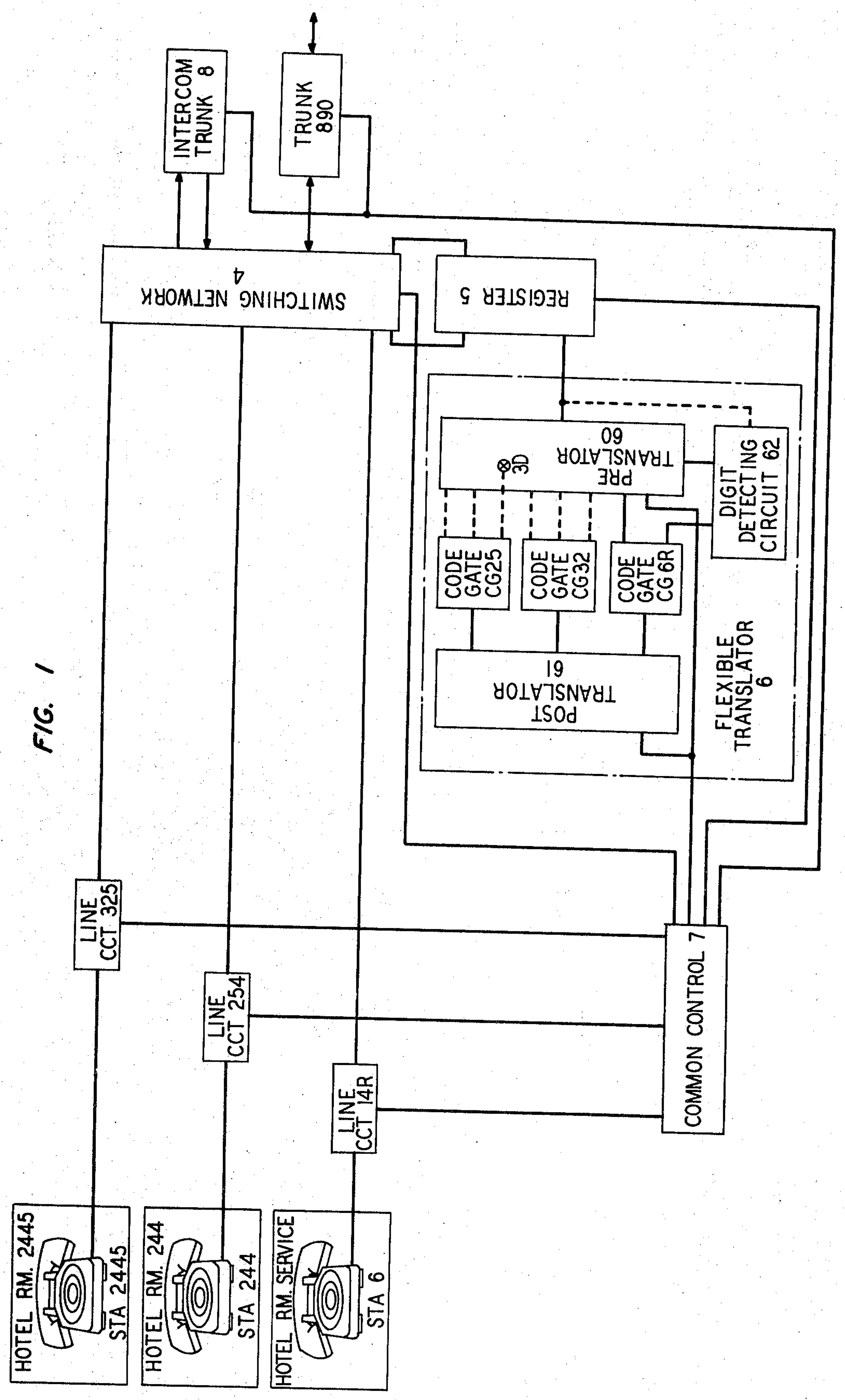
FIG. 1 illustrates an electronic switching system embodying the flexible translator apparatus of the instant invention.

Referring now to FIG. 1 of the drawing it is intended that flexible translator 6 shown thereon be associated with a conventional electronic PBX telephone switching system of the type set forth in U.S. Pat. No. 3,377,432 issued to H. H. Abbott el al. on Apr. 9, 1968. It is further intended for the purpose of illustrating our invention that the aforementioned switching system be associated with a commercial enterprise such as a hotel. The present invention is not limited for use with a telephone switching system of this type provided for hotels but may be advantageously utilized with this and other types of switching systems in a wide variety of commercial environments.

As denoted in the drawing of FIG. 1 it is assumed that the hotel management has expressed a desire that the telephone station located in guest room 2445 be assigned the station directory number 2445 and that the telephone station of guest room 244 be assigned station directory number 244. It is also assumed that the hotel management prefers that the telephone station of the room service department be assigned the station directory number 6.

The telephone stations are individually connected to line circuits, numbered 325, 254, and 14R respectively, of the switching system. Each line circuit is connected to common control 7 and to the left side of switching network 4. Intercom trunk 8, used to interconnect the switching system stations, and two-way trunk 890, used to establish connections between remote switching systems and stations of the switching system of FIG. 1, are connected to the right side of switching network 4. Register 5, connected to both the left and right side of switching network 4, functions to count and store successively dialed station number digits and to read out the stored digits to flexible translator 6. The flexible translator 6 in accordance with out invention comprises a pretranslator 60, a post translator 61, a digit detecting circuit 62, and a plurality of two and three input code gates, such as code gates CG6R, CG25, and CG32, selectively connected in accordance with the customer's requirements to pretranslator 60. The flexible translator 6 translates the received station number digits into the equipment number digits of the line circuits and transmits this information to common control 7. Common control 7 regulates and coordinates the operation of every circuit of the switching system during the serving of calls and, accordingly, is connected to line circuits 325, 254, and 14R, switching network 4, register 5, flexible translator 6, intercom trunk 8, and trunk 890.

In the present embodiment of the invention it is to be assumed that a room guest presently located in room 2445 desired to call another guest registered in room 244. The guest in the conventional and well-known manner lifts the handset of telephone station 2445. As described in detail by the aforesaid patent of H. H. Abbott et al. an off-hook telephone station, such as station 2445, is connected through line circuit 325 and the left hand side of switching network 4 to the right hand appearance of idle register 5, which in turn, supplies dial tone to the off-hook station. Upon receipt of dial tone the room guest proceeds to dial the three number digits 244 identifying the station of room 244 into register 5.

When the number digits of called station 244 have been recorded in register 5 the register transfers the three number digits over a plurality of parallel leads to pretranslator 60 of flexible translator 6. Pretranslator 60 translates each of the first two dialed station number digits 2 and 4 into 1-out-of-10 digital code points that are selectively connected in response to a customer's specific requirements to two H. H. terminals of a three input terminal code gate such as code gate CG25. Digit detecting circuit 62, noting the absence of a fourth digit recorded in register 5, enables common code point 3D to function in combination with the two aforementioned code points and operate code gate CG25. The post translator 61 translates the output of operated code gate CG25 into the first two digits 25 of line circuit 254 connected to called station 244 and transmits these digits to common control 7. Digit detecting circuit 62, in addition to enabling common code point 3D, allows pretranslator 60 to gate the third dialed digit 4 of called station number 244 recorded in register 5 through flexible translator 6 to common control 7. Common control 7, upon receipt of the translated line circuit number 254, proceeds in the conventional and well-known manner to establish a connection from calling station 2445 and the associated line circuit 325, through switching network 4 and intercom trunk 8, to line circuit 254 and called station 244.

In the event the guest located in room 2445 desires to call room service the single dialed digit 6 is recorded in register 5 and transmitted to pretranslator 60, which in turn, applies a first coincidence signal to one input terminal of a two input terminal code gate such as code gate CG6R. Digit detecting circuit 62, noting that only one digit has been recorded in register 5, applies a second coincident signal to the second input terminal of code gate CG6R to allow post translator 61 to generate the first two digits 14 of line circuit 14R. In addition, the digit detecting circuit 62 also enables pretranslator 60 to gate a rest digit R from register 5 into common control 7. As described in detail by the aforementioned patent of H.H. Abbott et al. common control 7 completes a connection from calling station 2445 to the hotel room service station 6.

When the guest in room 244 places a call to the guest in room 2445, register 5 transfers the first three dialed digits of the called station number 2445 to pretranslator 60 to operate code gate CG32 and enable post translator 61 to transmit the first two digits 32 of line circuit 325 to common control 7. Digit detecting circuit 62, noting the presence of a fourth dialed digit recorded in register 5, enables pretranslator 60 to gate the last dialed digit 5 of station number 2445 through flexible translator 6 to common control 7 in order that a connection may be established from calling station 244 to called station 2445.

DETAILED DESCRIPTION

1. General

Referring now to FIGS. 2 and 3, arranged in accordance with FIG. 5, it is assumed that register 5 records and stores the called station directory numbers generated by users of the switching system stations in number digit storage locations described in detail by the aforementioned Abbott patent. Each of the register digit storage locations designated as a thousands, hundreds, tens, and units storage locations, respectively, is connected by seven digit leads to pretranslator 60 of flexible translator 6.

When register 5 is in the idle state, that is to say there are no number digits recorded in the register digit storage locations, a low signal is placed on every digit lead extending to flexible translator 6. A recorded directory number digit is transferred from a register storage location to flexible translator 6 by placing low signals on two of the seven digit leads in accordance with the table set forth in FIG. 4 and high signals on the five remaining leads. For example, assuming that a thousands number digit 3 has been recorded in register 5, low signals would appear on leads THZ and THA and high signals on the remaining leads THX, THY, THB, THC, and THD.

Pretranslator 60 consists of thousands digit translator 601, hundreds digit translator 602, and tens digit translator 603. The digit translators are made up of ten logic NOR gates each connected to two of the seven digit leads and arranged so that low signals appearing on two of the seven digit leads are translated into 1-out-of-10 code points corresponding to the number digit recorded in a register storage location. Also included in pretranslator 60 are a plurality of logic NOR gates connected to digit leads associated with both the register tens and units storage locations and arranged under control of digit detecting circuit 62 to enable other NOR gates to gate the recorded tens or units digit of register 5 into common control 7.

Ten code NAND gates, each having two input terminals and designated CGOR through CG9R, are provided in order that the registration of a single digit identifying a called station in register 5 may be utilized to identify the first two number digits of the line circuit connected to the called station. A first input terminals of each of these gates is connected, via a correspondingly numbered TH1-lead, to the output of an identifying NOR gate of thousands digit translator 601. The remaining input terminals of these code gates are coupled together and connected, via lead HR, to digit detecting circuit 62.

A plurality of three input terminal code gates are provided to identify the line circuits of the switching system that are connected to telephone stations assigned three and four digit station numbers. Each of the three terminal code gates CG11 through CG36 identify the first two digits of ten line circuits assigned to telephone stations having either three or four digit directory numbers. For example, code gate CG25 identifies the first two digits of line circuits 250 through 259 while code gate CG32 identifies the first two digits of line circuits 320 through 329. In the manner hereinafter described in detail 10 telephone stations all assigned three or four digit directory numbers may be connected to any group of 10 line circuits.

The outputs of both the two and three terminal code gates are connected to post translator 61 in order that the operation of one code gate may be translated into the first two digits of the line circuit connected to the called station. Each of these digits are then transmitted to common control 7 by placing low signals in accordance with the code format set forth by the table of FIG. 4 on two of the seven parallel digital leads extending from post translator 61 to common control 7 for that digit.

In the present embodiment of the invention it is intended that the number of three terminal code gates may be increased or decreased in relation to a specific customer's telephone station requirements. Thus, when the switching system is initially installed on a customer's premises it may be that only a few three terminal code gates are required to fulfill a customer's station requirements. Later, additional three terminal code gates may be added to flexible translator 6 when more telephone stations are connected to the switching system in response to a customer's growth requirements.

The instant embodiment of the invention assumes that the hotel administration has requested that the telephone stations located in rooms 2445 and 244 and connected to line circuits 325 and 254, respectively, be assigned a station directory number identical to the room number wherein the station is located. It is also assumed that the telephone station connected to line circuit 14R is for use by the hotel room service department and that any guest room telephone station may be connected to the room service telephone station by the room guest dialing the single number digit 6. Accordingly, code gate CG32 identifying the group of ten line circuits wherein line circuit 325 is located, has a first input terminal strapped to code point 2 of thousands digit translator 601. The second and third input terminals are individually strapped to the code points 4 of hundreds digit translator 602 and tens digit translator 603. The output of code gate CG32 is connected to respective inputs of NAND gates HGZO, HGAO, TGYO, and TGAO of post translator 61 in order that the first two digits of the line circuit numbers may be transmitted to common control 7 in accordance with the 2-out-of-7 code format set forth in the table of FIG. 4.

Similarly, the first and second input terminals of code gate CG25 are individually connected to code points 2 and 4 of thousands digit translator 601 and hundreds digit translator 602, respectively. The third input terminal of code gate CG25 and of all other code gates identifying the switching system telephone stations assigned three digit directory numbers are connected to a common code point 3D of tens digit translator 603. NAND gates HGYO, HGAO, TGYO, and TGBO of post translator 61 have inputs connected to the output of code gate CG25 and are enabled by the operation of the code gate to transmit the first two digits of line circuit 254 to common control 7. Code gate CG6R, identifying the hotel room service telephone station 6, has an input terminal connected to NOR gate TH6 of thousands digit translator 601 and is connected to NAND gates HGXO, HGAO, TGXO, and TGBO of post translator 61 to identify the first two digits of line circuit 14R.

In summary, the code gates of flexible translator 6 are selectively strapped in accordance with customer's station numbering requirements to the appropriate code points of pretranslator 60 in order that the first two digits of the line circuit connected to the called telephone station may be identified and forwarded to common control 7. The last dialed digit of three and four digit directory numbers are gated through flexible translator 6 to form the third digit of the specific line circuit connected to the called station. For the sake of simplicity the wiring details connecting pretranslator 60 to the digit storage locations of register 5 have been greatly reduced to those necessary to clearly illustrate the operating principles of the invention. Similarly, only the wiring connections between pretranslator 60, the code gates, and post translator 61 needed to permit the interconnection of the telephone stations shown in FIG. 1 are represented in order to simplify FIGS. 2 and 3 of the drawing.

2. Single Digit Station Calls

A guest located in room 2445, FIG. 1 of the drawing, initiates a call to room service by lifting the handset of telephone station 2445 and dialing the single digit 6 over a connection extending through line circuit 325 and switching network 4 into register 5. Dialed digit 6 is recorded in the thousands storage location of register 5 and the register hundreds, tens, and units storage locations remain in the rest state. The digit 6 is read out of the register thousands digit storage location over digit leads to flexible translator 6, FIGS. 2 and 3, by placing low signals on leads THZ and THB and high signals on leads THX, THY, THA, THC, and THD. During the read sequence register 5 places a high signal on lead RD and common control 7 places a low signal on lead A1. When the register hundreds and units storage locations are in the rest state register 5 is enabled to place a high signal on lead IHR and a low signal on lead FDD to indicate to flexible translator 6 that a hundreds and units digit have not been dialed by a telephone station user.

The high signal appearing on lead RD is inverted and applied to an input of NOR gate HRO of digit detecting circuit 62 to partially enable this gate during the read register sequence. When register 5 has recorded a single dialed digit the resulting high signal appearing on lead IHR inhibits NOR gate HRO in order that a high signal, via inverter HR1, may be placed on lead HR to partially enable input terminals of code gates CGOR through CG9R. The low signals appearing on digit leads THZ and THB enable NOR gate TH6 of thousands digit translator 601 to place a high signal on lead TH16 connected to one of the two terminals of code gate CG6R.

The high signals placed on both input terminals operate code gate CG6R to place low signals on the inputs of NAND gates HGXO, HGAO, TGXO, and TGBO located in post translator 61. These gates operate and enable their connecting inverters HGX, HGA, TGX, and TGB to place low signals on their respective output digital leads HX1, HA1, TX1, and TB1 to common control 7. The low signal appearing on lead FDD during the register readout sequence acts in combination with the rest digit low signal appearing on tens digit leads TZ and TD to operate NOR gates TZO and TDO of pretranslator 60. The resulting high output signal from these gates enable NOR gates UGZ and UGD to place low signals on their respective output digital leads UZ and UD extending to common control 7.

In summary, the single dialed digit 6 read from register 5 in combination with control signals appearing on leads FDD, 1HR, and RD is translated by a two terminal code gate of flexible translator 6 into the line circuit number 14R and transmitted to common control 7 in the 2-out-of-7 code format set forth in FIG. 4. Common control 7, in the manner set forth in the aforementioned Abbott patent, establishes a communication path by means of switching network 4 and intercom trunk 8 from calling station 2445 and line circuit 325 to line circuit 14R and called station 6.

3. Three Digit Station Calls

The guest of room 2445, desiring to converse with a guest staying in room 244, removes the handset of telephone station 2445 and dials the three digits of the called station directory number 244 into register 5. Register 5 records the dialed station digit 2 in the register thousands storage location and the dialed digits 44 in the hundreds and tens storage locations, respectively. When the switching system is in the read register mode common control 7 places a low signal on lead A1 and register 5 reads the three dialed station digits 244 into flexible translator 6, FIGS. 2 and 3, by simultaneously placing low signals on digital leads THY, THA, HX, HB, TX, TB, and a high signal on control lead RD. Since the register hundreds storage location has stored therein the dialed digit 4, and the units storage location remains in the rest state, low signals are placed on leads IHR and FDD during the register read interval.

The high signal on lead RD, applied via inverter HR2 to an input of NOR gate HRO, operates in combination with the low signal appearing on lead IHR to enable gate HRO to place a low signal on lead HR and inhibit the two input terminal code gates CGOR through CG9R. Similarly, low signals appearing on leads FDD and A1 enables both NOR gate ENAB to place a high signal on common code point 3D and Nor gate ENAC to inhibit translation NOR gates TO through T9 of tens digit translator 603. Thus, the low signals appearing on thousands and hundreds digit leads THY, THA, HX, and HB, respectively, enable NOR gates TH2 and H4 of thousands and hundreds digit translators 601 and 602 to operate and place high signals on their respective code points.

The high signals appearing on these code points along with the high signal on common code point 3D operate code gate CG25 to place a low signal on the inputs of NAND gates HGYO, HGAO, TGYO, and TGBO of post translator 61. These gates are, in turn, enabled to place low signals on hundreds and tens digital leads HY1, HA1, TY1, and TB1 to transmit digits 2 and 5 to common control 7. The low signal on lead FDD enables NOR gates TXO and TBO to operate NOR gates UGX and UGB to transmit the low signals appearing on the register tens digit leads TX and TB to common control 7 over units digital leads UX1 and UB1.

On a dialed three digit station call directed to called station 244 flexible translator 6 utilized the first two dialed digits 24 in combination with an enabled common code point to operate a predetermined three input terminal code gate and generate the first two digits 25 of the line circuit connected to the called station 244. The third dialed digit 4 is gated from register 5 through the logic of flexible translator 6 to common control 7 in order that a connection may be established in the well-known manner from calling station 2445 and line circuit 325 through the switching system to line circuit 254 and called station 244.

4. Four Digit Station Calls

When a call is directed to the telephone station assigned the directory number 2445, register 5 places low signals on register digit leads THY, THA, HX, HB, TX, TB, UY, and UB. The low signals on the first four of these leads operate NOR gates TH2 and H4 of thousands digit translator 601 and hundreds digit translator 602 to place high signals on two of the three inputs of code gates CG25 and CG32. Since a dialed digit is recorded in the units storage position of the register, lead FDD remains high to inhibit NOR gates ENAC and ENAB.

The resulting low signal outputs of these inhibited gates prevent the operation of code gate CG25 and enable NOR gate T4 of tens digit translator 603 to place a high signal on the remaining input terminal of code gate CG32. Code gate CG32, having high signals appearing on all three input terminals, operates NAND gates HGZO, HGAO, TGYO, and TGAO of post translator 61 to transmit digits 32 to common control 7 by causing low signals to be placed on digital leads HZ1, HA1, TY1, and TA1. The high signal on lead FDD is converted into a low signal by inverter FD thereby permitting NOR gates UYO and UBO to enable NOR gates UGY and UGB to gate the digit 5 appearing as low signals on digit leads UY and UB into common control 7 by placing low signals on digital leads UY1 and UB1.

Thus, on a call to a station assigned a four digit number the first three digits enable a predetermined three terminal code gate to generate the first two digits of a group of line circuits. The fourth digit of the dialed station number is gated through the translator to become the third digit of the specific line circuit connected to the called station.

5. Attendant and Outgoing Trunk Calls

Flexible translator 6 is arranged so that the single digit 0 and the three digit number 890 recorded in register are translated into signals that direct common control 7 to connect a calling station to an attendant position or to an outgoing trunk. The single dialed digit 0 recorded in register 5 enables NOR gate THO of thousands digit translator 601 and NOR gate HRO of digit detecting circuit 62 in the aforementioned manner described for single digit station calls to operate code gate CGOR. Operated code gate CGOR enables NAND gates HGXO and HGDO to transmit the digit 0 to common control 7 over digital leads HX1 and HD1.

When the three digits 890 are utilized to identify a call request for a connection to outgoing trunk 890 the three input terminals of code gate CG89R are strapped to code points 8, 9, and 3D located in thousands, hundreds, and tens digit translators 601, 602, and 603, respectively. Thus, the three dialed digits 890 recorded in register 5 function similar to a three digit station call to operate code gate CG89R and transmit a low signal over lead CG89 to common control 7 in order that a connection may be established in the well-known manner from the calling station and line circuit through switching network 4 to outgoing trunk 890.

SUMMARY

It is obvious from the foregoing that the flexibility, economy, and efficiency of PBX switching systems may be enhanced by the provision of a flexible translator wherein stations of a switching system may be assigned directory numbers in accordance with customer's unique station numbering requirements. It is further obvious from the foregoing that the aforesaid flexible translator arrangement for translating one, three, and four digit input numbers into three digit output numbers by employing cross-connected ones of an expandable group of code gates and selectively gating an input digit through the translating apparatus to obtain the first two and third digits of the output number obviates the need for initially equipping an electronic switching system with a full complement of translating apparatus uniquely associated with each specific digit of an input number.

While the equipment of our invention has been disclosed in an electronic switching system, it is to be understood that such an embodiment is intended to be illustrative of the principles of our invention and that numerous other arrangements utilizing the instant flexible translator may be devised by those skilled in the art without departing from the spirit and scope of the invention.

What is claimed is:

1. A translator for translating multidigit input numbers into multidigit output numbers comprising multiterminal means enabled by first and second coincident signals for generating first ones of the digits of the output numbers, means including a first plurality of code points selectively connected to certain input terminals of said multiterminal means for pretranslating first ones of the digits of the input numbers into said first coincident signals and for associating said first coincident signals with predetermined ones of said code points, means including a second plurality of code points and a common code point selectively connected to other input terminals of said multiterminal means for pretranslating a subsequent one of the digits of the input numbers and the absence of a predetermined one of the digits of the input numbers into said second coincident signals and for selectively associating said second coincident signals with predetermined ones of said second plurality of code points and said common code point, and means responsive to the number of the digits of the input numbers for controlling the pretranslation of said second coincident signals.

2. A translator in accordance with claim 1 further comprising means for selectively employing the last digit of the input numbers as the last digit of the output numbers.

3. A translator in accordance with claim 1 further comprising a plurality of two terminal code gates for translating single digit input numbers into the first digits of the output numbers, first terminals of said two terminal gates being selectively connected to certain of said first plurality of code points, means responsive to the detection of the single digit input numbers for applying an enabling signal to the second terminals of said two terminal gates, and means for directly employing a predetermined digit as the last digit of the output numbers on detection of the single digit input numbers.

4. A translator in accordance with claim 1 wherein said multiterminal means comprise a plurality of three terminal code gates, said first coincident signals are applied to the first two terminals of said gates, and said second coincident signals are applied to the third terminals of said gates.

5. A translator for translating a nonuniform number of input number digits into a uniform number of output number digits comprising means including a plurality of multiterminal code gates responsive to first and second coincident signals for generating first ones of said output number digits, first pretranslator means having a first plurality of code points selectively connected to first input terminals of said gates for applying said first coincident signals thereto in response to first ones of said input number digits, second pretranslator means having a second plurality of code points selectively connected to second input terminals of said gates, means responsive to the number of digits of the input number for determining the selective enablement of said second plurality of code points to provide said second coincident signals to said gates, and means responsive to the number of digits of the input number for employing a last one of the input number digits as a last one of the output number digits.

6. A translator in accordance with claim 5 wherein said second plurality of code points includes a plurality of individual code points and a common code point and wherein said means for determining the selective enablement of said second plurality of code points includes logic means responsive to a first number of input digits for enabling said individual code points and responsive to a second number of input digits for enabling said common code point.

7. A translator in accordance with claim 5 wherein said means for generating first ones of said output number digits includes a post translator.

8. A translator for use in a switching system wherein called number digits are translated into equipment number digits, the equipment numbers comprising a uniform number of digits while the called numbers comprise a variable number of digits, the translator comprising a plurality of three input terminal code gates, post translator means connected to said code gates for generating first ones of the equipment number digits, means having first code points selectively connected to a first two of said input terminals of said code gates for pretranslating first ones of said called number digits into first coincident signals and associating said first coincident signals with first code points, means having second code points selectively connected to third input terminals of certain of said code gates for pretranslating third digits of four digit called numbers into second coincident signals and associating said second coincident signals with said second code points, means including a common code point selectively connected to third terminals of other of said code gates for generating further second coincident signals for called numbers of only three digits and associating said further second coincident signals with said common code point, and means responsive to the number of digits of the called numbers for selectively controlling the pretranslation of said second coincident signals and the generation of said further second coincident signals.

9. A translator in accordance with claim 8 further comprising means for utilizing a last one of the called number digits as a last one of the equipment number digits.

10. A translator in accordance with claim 8 wherein said means for selectively controlling the pretranslation of said second coincident signals and the generation of said further second coincident signals include first logic means for enabling said second code points, and second logic means for selectively enabling said first logic means and said common code point.

11. In a translator for a switching system wherein three and four digit codes may be stored in a register means for translation and wherein translated three digit codes are applied to control means, the combination comprising a plurality of three terminal code gates, post translator means connected to said code gates for generating the first two digits of the translated codes, first means for connecting the first two terminals of said code gates to the register means for the first two digits of the codes to be translated, second means for connecting the third terminal of certain of said code gates to the register means for the third digit of four digit codes to be translated and including a common code point connected to the third terminals of others of said code gates for three digit codes to be translated, third means connected to the register means for selectively applying the third digit of three digit codes and the fourth digit of four digit codes directly to the control means, and fourth means responsive to the presence of three digit and four digit codes in the register means for selectively enabling said third means and for causing said second means to selectively enable said third terminal of said certtian code gates and said common code point.

12. In a translator, the combination in accordance with claim 11 wherein said second means includes a plurality of first gate means connected to the register means for the third digit stored in the register means, and wherein said fourth means includes logic means for enabling the first gate means of said second means and said common code point.

13. In a translator, the combination in accordance with claim 12 wherein said third means includes a plurality of second gate means connected to the register means for the third digit stored in the register means and a plurality of third gate means connected to the register means for the fourth digit stored in the register means and said fourth means includes means for controlling said second and third gate means.

14. In a telephone switching system wherein a calling telephone may be connected to certain called telephones by the dialing of three digits and may be connected to certain other called telephones by the dialling of four digits, the combination comprising register means in which the dialed digits are stored, control means for receiving three digit numbers identifying the equipment locations of the called telephones, three terminal code gates, first logic gates selectively connected to the outputs of said code gates for translating output signals therefrom into the first two digits of the three digit equipment location number, first translator gates terminated in first code points connected to first terminals of said code gates, said first translator gates being responsive to the first dialed digits stored in said register means, second translator gates terminated in second code points pints connected to second terminals of said code gates, said second translator gates being responsive to the second dialed digits stored in said register means, third translator gates terminated in third code points connected to third terminals of certain of said code gates, said third translator means being responsive to the third dialed digits in stored register means, a common code point connected to third terminals of others of said code gates, means responsive to the presence of three dialed digits stored in said register means for inhibiting said third translator gates and enabling said common code point and responsive to the presence of four dialed digits in said register means for inhibiting said common code point and enabling said third translator means, and logic gates for selectively converting the last digit of said three and four dialed digits stored in said register means into outgoing signals corresponding to the last digit of the three digit equipment location number and applying said last equipment number location digit to said control means.

* * * * *